United States Patent
Radha et al.

(10) Patent No.: US 6,501,397 B1
(45) Date of Patent: Dec. 31, 2002

(54) BIT-PLANE DEPENDENT SIGNAL COMPRESSION

(75) Inventors: Hayder Radha, Mahwah, NJ (US); Yingwei Chen, Ossining, NY (US); Mihaela Van Der Schaar-Mitrea, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/578,286

(22) Filed: May 25, 2000

(51) Int. Cl.$^7$ ............................................. H03M 7/00
(52) U.S. Cl. .................................... 341/60; 341/63
(58) Field of Search ........................... 341/60, 51, 63, 341/67, 95, 107; 358/426

(56) References Cited

U.S. PATENT DOCUMENTS

| | | | | |
|---|---|---|---|---|
| 4,706,265 A | * | 11/1987 | Furukawa | 375/122 |
| 5,471,206 A | * | 11/1995 | Allen et al. | 341/51 |
| 5,566,001 A | * | 10/1996 | Saidi et al. | 358/426 |
| 5,689,588 A | | 11/1997 | Rombola et al. | 382/237 |
| 5,933,249 A | | 8/1999 | Shimura et al. | 358/429 |
| 5,956,425 A | | 9/1999 | Yoshida | 382/234 |
| 5,959,560 A | * | 9/1999 | Said et al. | 341/107 |
| 6,088,369 A | * | 7/2000 | Dabecki et al. | 370/503 |
| 6,236,341 B1 | * | 5/2001 | Dorward et al. | 341/60 |
| 6,300,888 B1 | * | 10/2001 | Chen et al. | 341/63 |

FOREIGN PATENT DOCUMENTS

| | | | | |
|---|---|---|---|---|
| EP | 0442096 A2 | 12/1990 | | H04N/7/13 |
| EP | 0708552 A2 | 10/1995 | | H04N/1/41 |
| EP | 0899960 A2 | 3/1999 | | H04N/7/26 |
| EP | 0899960 A3 | 3/1999 | | H04N/7/26 |
| EP | 0914004 A1 | 5/1999 | | H04N/7/26 |
| EP | 0938235 A1 | 8/1999 | | H04N/7/26 |
| WO | WO9703516 | 1/1997 | | H04N/1/41 |
| WO | WO9837700 | 8/1998 | | H04N/7/30 |
| WO | WO9908449 | 2/1999 | | H04N/7/26 |

* cited by examiner

*Primary Examiner*—Peguy JeanPierre
*Assistant Examiner*—Joseph Lauture
(74) *Attorney, Agent, or Firm*—Russell Gross

(57) ABSTRACT

The present invention is directed to a variable coding of the bit-planes for a particular source signal. This includes first partitioning or grouping the different bit-planes into embedded sub-signals and then coding each sub-signal. This technique enables an encoder according to the present invention to control and achieve a desired trade-off point between scalability and coding-efficiency. Therefore, in cases where bit or bit-plane level granularity is not required, coding efficiency can be improved by combining two or more bit-planes prior to coding. In addition, since the statistical nature of each bit-plane is different, the level of grouping used across the bit-planes can vary.

13 Claims, 3 Drawing Sheets

BIT-PLANE DEPENDENT SIGNAL COMPRESSION

BACKGROUND OF THE INVENTION

The present invention generally relates to signal compression techniques, and more particularly to a compression technique that includes dividing the source signal into sub-signals and then encoding each of the sub-signals.

Bit-plane compression of digital signals is a popular coding method for many multimedia applications. For example, bit-plane coding of audiovisual signals enables progressive and scalable transmission of these signals. Typically, an audio or a visual signal undergoes some type of a transform prior to bit-plane coding. Examples of such transforms include the Discrete Cosine Transform (DCT) or the Discrete Wavelet Transform (DWT).

After performing one of the above-described transforms, each bit-plane included in the signal is then scanned and coded starting with the Most-Significant-Bit (MSB) representation of the signal and ending with the Least-Significant-Bit (LSB). Therefore, if each of the transform coefficients is represented by n bits, there are n corresponding bit-planes to be coded and transmitted.

Depending on a particular fidelity criterion (e.g., maximum allowable distortion) or a bit-rate budget constraint, the coding of the signal may be limited to a particular bit-plane. This approach provides the progressive feature of bit-plane compression especially when the coding is taking place in real-time, which can be at the same time the signal is being transmitted. For signals coded off-line or prior to transmission, bit-plane coding results in an embedded and scalable bit-stream. This enables the sender to limit the transmission of the stream at or within a particular bit-plane in response to, for example, to network conditions such as available bandwidth.

Consequently, bit-plane compression, in general, provides a very Fine-Granular-Scalability (FGS) coding of the signal. Depending on the particular method used for coding the bit-planes, this granularity could be as fine as a single bit or as coarse as an entire bit-plane. Therefore, if a signal is bit-plane coded using n planes and a total number of b bits, the resulting compressed stream could include anywhere between n and b progressive representations of the original signal embedded in that stream.

SUMMARY OF THE INVENTION

The present invention is directed to a method for compressing a signal. The method partitions the signal into a plurality of sub-signals and codes each of the sub-signals according to a different coding technique. Further, the sub-signals either include different bit-planes or different bits from the same bit-plane of the signal.

The present invention is also directed to method for compressing a signal that determines a "best choice" partition for the signal. The signal is partitioned into a plurality of sub-signals according to the "best choice" partition and then codes the sub-signals. The "best choice" partition is determined by defining a number of different partitions for the signal. Further, an entropy value for each of the partitions is calculated and the partition having a minimum entropy value is selected.

The present invention is also directed to a method for de-compressing a signal including sub-signals and partition information indicating how the signal was partitioned into sub-signals. The method includes decoding each of the sub-signals and then combining the sub-signals according to the partition information.

BRIEF DESCRIPTION OF THE DRAWINGS

Referring now to the drawings were like reference numbers represent corresponding parts throughout.

DETAILED DESCRIPTION

As previously described, bit-plane compression, in general, provides a very Fine-Granular-Scalability (FGS) coding of the signal. However, the fine-granularity of bit-plane coding potentially comes at the expense of loosing coding efficiency. This has led most popular video compression standards (e.g., MPEG-1, MPEG-2, and MPEG-4 video) to adapt schemes, which scan and code the transform coefficients as a whole versus scanning and coding the individual bit-planes of the transform coefficients in a progressive manner. This standard approach leads to an efficient coding of the signal, however, scalability is sacrificed.

In view of the above, the present invention is directed to a variable coding of the bit-planes of a source signal. This includes first partitioning or grouping the different bit-planes into sub-signals and then coding each sub-signal. This technique enables an encoder according to the present invention to control and achieve a desired trade-off point between scalability and coding-efficiency. Therefore, in cases where bit or bit-plane level granularity is not required, coding efficiency can be improved by combining two or more bit-planes prior to coding. In addition, since the statistical nature of each bit-plane is different, the level of grouping used across the bit-planes can vary.

As described above, the present invention is based on partitioning the source signal into variable depth sub-signals prior to coding. For the purpose of the discussion, it is assumed that the source signal has been previously digitized and has undergone some kind of transform such as either the Discrete Cosine Transform (DCT) or the Discrete Wavelet Transform (DWT). However, according to the present invention, it is also contemplated that the source signal is only digitized.

Figure 1:
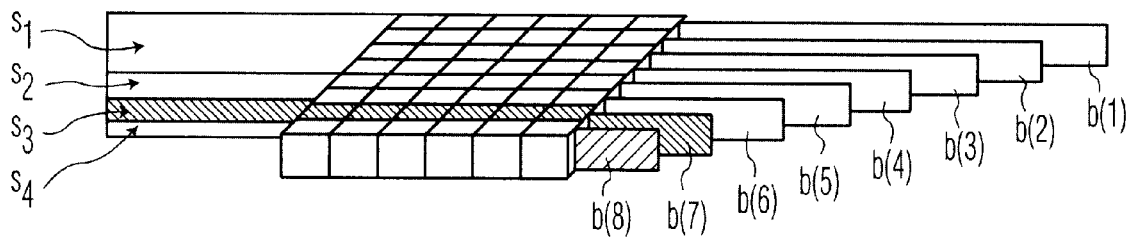
FIG. 1 is a diagram showing one example of the bit-plane partitioning according to the present invention.

One example of the partitioning according to the present is shown in FIG. 1. In this example, the source data is partitioned so that each of the sub-signals $s_1$–$s_4$ includes different bit-planes. In the partitioning of FIG. 1, the source signal S includes n bit-planes. Here it is assumed that every coefficient in S is represented with n bits prior to the coding of S. Therefore, the signal can be divided into the n bit-planes: $b(j)$, $j=1, 2, \ldots, n$.

Further, m sub-signals $s_l$ are defined to represent S, where each sub-signal includes one or more of the bit-planes $b(j)$. Let $k_l$ be the number of consecutive bit-planes grouped within sub-signal $s_l$, $l=1, 2, \ldots m$. Consequently, a sub-signal $s_l$ includes the bit-planes:

$$s_l = \left\{ b\left(1 + \sum_{i=1}^{l-1} k_i\right), b\left(2 + \sum_{i=1}^{l-1} k_i\right), \ldots b\left(k_l - 1 + \sum_{i=1}^{l-1} k_i\right), b\left(\sum_{i=1}^{l} k_i\right) \right\} \quad (1)$$

Based on this partitioning, $$\sum_{i}^{m} k_i = n. $$

For example, the signal S consists of eight bit-planes. If the S signal is divided into four sub-signals using $k_1=4$, $k_2=2$, $k_3=1$ and $k_4=1$, this leads to the sub-signals $s_1$, $s_2$, $s_3$ and $s_4$ with four, two, one, and one bit-planes, respectively as shown in FIG. 1. In this example, $s_1=\{b(1), b(2), b(3), b(4)\}$, $s_2=\{b(5), b(6)\}$, $s_3=\{b(7)\}$, and $s_4=\{b(8)\}$.

Figure 2:
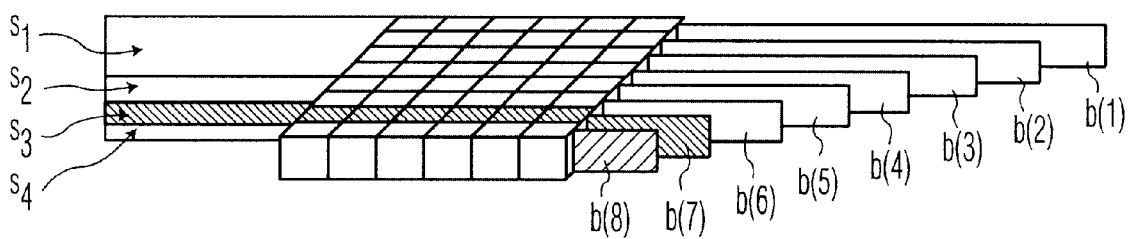
FIG. 2 is a diagram showing another example of the bit-plane partitioning according to the present invention.

Another example of the partitioning according to the present invention is shown in FIG. 2. In this example, the source signal is partitioned so that not all of the sub-signals $s_1$–$s_4$ include entire bit planes. In other words, the partitioning of FIG. 2 uses a variable number of bits from different coefficients of the source signal when partitioning into the-sub-signals. This could be very useful for transformed signals (e.g., DCT or DWT) since different coefficients have different significance in terms of the amount of energy they contain. Therefore, a variable number of bits are used within each layer (or sub-signal) to improve the overall coding performance of that particular sub-signal.

In the example of FIG. 2, a particular bit-plane may have bits belonging to more than one sub-signal. Therefore, the source signal S is partitioned so that sub-signals $s_1$ and $s_2$ each include different bits of bit-planes $b(2)$, $b(3)$, and $b(4)$.

Figure 3:
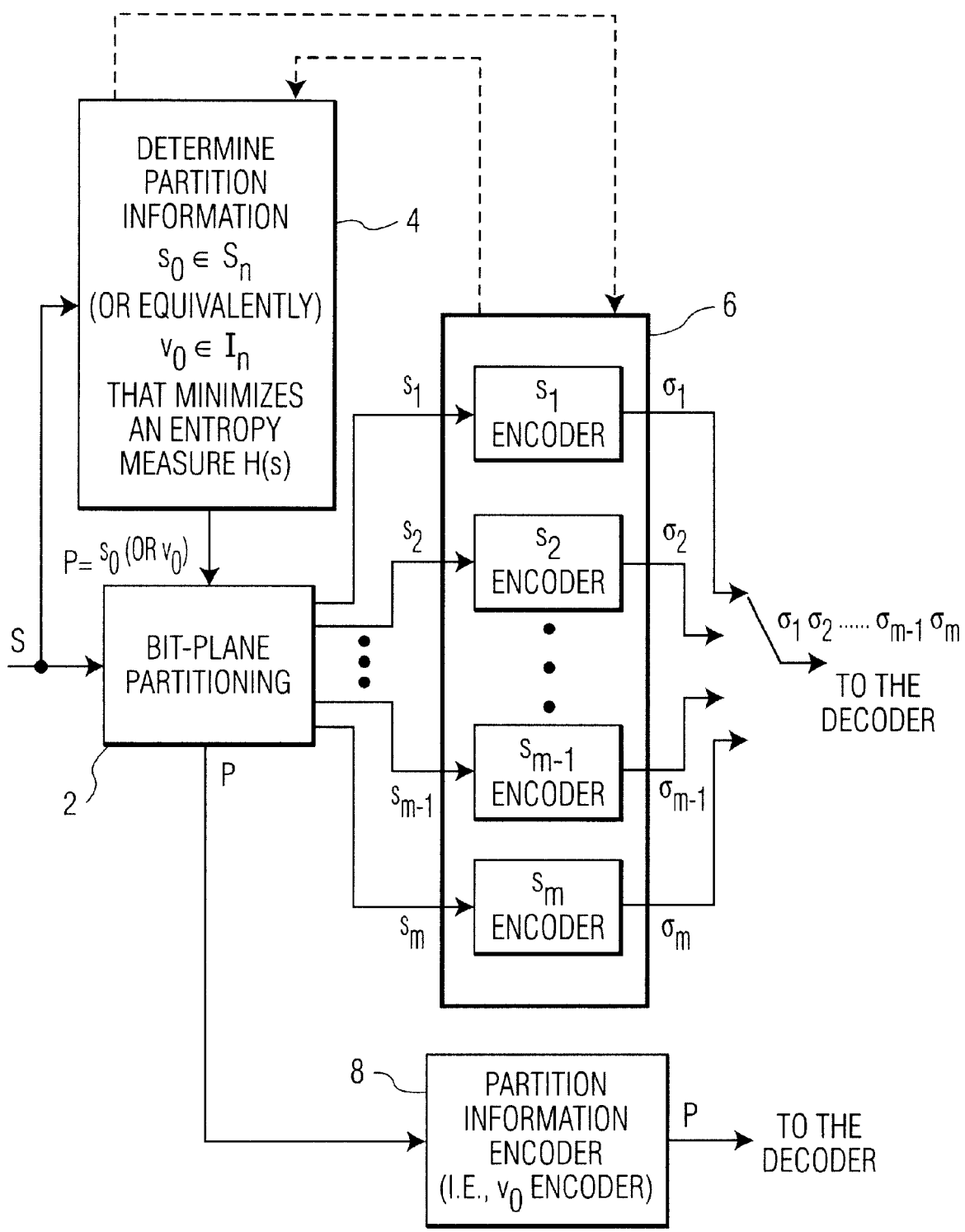
FIG. 3 is a block diagram illustrating one example of the bit-plane compression according to the present invention.

One example of the bit-plane compression according to the present invention is shown in FIG. 3. As can be seen from FIG. 3, bit-plane partitioning 2 is performed on the source signal S in order to generate the sub-signals $s_1$, $s_2$, . . . , $s_m$. According to the present invention, the bit plane partitioning 2 can be performed in a predetermined manner similar to FIGS. 1 or 2. However, it is preferred that the partitioning 2 be variably performed in order to maximize the coding efficiency for a given source signal S.

In order to perform the partitioning variably, a process is included to determine partition information 4 that indicates the "best choice partition" for a given signal S that maximizes the coding efficiency for the signal S. In regard to this process 4, the superset $I_n$ is defined. Each element in $I_n$ is a vector of integers $v=(k_1, k_2, \ldots, k_m)$ such that the sum of these integers equals to n (here n represents the number of bit-planes in the signal S). In other words:

$$I_n = \left\{ v = (k_1, k_2, \ldots, k_m) : \text{such that} \sum_{i=1}^{m} k_i = n \text{ where } m = 1, 2, \ldots, n \right\} \quad (2)$$

A special member of $I_n$ is the vector $v=(n)$ which includes only the single integer. This is the only permissible vector when $m=1$ (i.e., when S is partitioned into a single sub-signal). Another special member of $I_n$ is the all-one vector $v=(1, 1, 1, \ldots, 1)$. This is the only permissible vector when $m=n$ (i.e., when S is partitioned into n sub-signals).

Based on the set of integer-vectors $I_n$, a set $S_n$ is defined of all possible ways of partitioning a signal S (consisting of n bit-planes) into the sub-signals $s_1, s_2, \ldots, s_m$ such that $s_1$ consists of the $k_1$ most-significant bit-planes, $s_2$ consists of the next (consecutive) $k_2$ bit-planes, and so on:

$$S_n = \{s = (s_1, s_2, \ldots, s_m): \text{such that } (k_1, k_2, \ldots, k_m) \in I_n\} \quad (3)$$

Here s denotes to a member of $S_n$. Thus, finding the partition information is based on identifying the element $s_o$ in $S_n$ that meets the following criterion:

$$s_0 = \min_{s \in S_n} H(s) \quad (4)$$

Here, H(s) is a measure of the total entropy of the partition s (which is a member of $S_n$):

$$H(s) = \sum_{i=1}^{m} w(s_i; \eta) \cdot H(s_i) \quad (5)$$

The weighting factor w is a function of the sub-signal $s_i$ and other network-related variables (which are represented by the parameter $\eta$). For example, if the system is trying to cover a bit-rate (or bandwidth) range over which the data may be transmitted, then the different weighting factors (w's) can measure how much granularity the decomposition s provides in covering the desired bit-rate range. In this case, and since we are looking for the minimum (as expressed in Equation 4), then the more granularity (i.e., the finer) the decomposition s provides over the desired bit-rates, the smaller the values for w should be.

The partition $s_o$ is referred to as the "best" choice partition. According to Equation (4), the "best choice" partition $s_o$ will have a minimum total entropy measure for the sub-signals included in that partition of the signal S. It is important to note that $s_o$ corresponds to a unique integer-vector $v_o$ from the set $I_n$. The integer-vector $v_o$ is referred to as the "best" choice vector and thus in the example of FIG. 3 will be preferably used as the partition information P. Thus, the bit plane partitioning 2 will be performed according to the partition information P in order to maximize the coding efficiency for the signal S. Further, the partitioning information P will also be coded by a partition information encoder 8 and transmitted to a decoder(s), as shown.

The entropy measure H can significantly influence the selection of the "best" choice partition. There are several approaches that can be used to measure the entropy H. Ideally, one would measure the entropy taking into consideration the method used for encoding each sub-signal resulting from the partition. Therefore, and as shown in 3, one possibility is that the process used for selecting the best choice $s_o$ (from the set $S_n$) takes into consideration (as an input to the process) the different entropy encoders used by the system. (Encoders that can be used in such a system are described below.)

Further, another possible approach for computing H would be to use the classical well-known Shannon measure for entropy. This later case is an example of a scenario when the selection process may not need to use (as an input) the different types of encoders actually being used by the system. Consequently, this can simplify the selection process. Yet another possibility is to use an entropy measure which can approximate or estimate the actual sub-signal encoders used by the system.

Since the number of possible partitions of S (i.e., the number of members in the set $S_n$) could be very large ($=2^{(n-1)}$), it is desirable to consider a subset of these all-possible partitions. In other words, we can consider a subset $J_n$ of the superset $I_n$ of integer vectors: $J_n \subseteq I_n$. For example, in addition to the condition $$\sum_{i=1}^{m} k_i = n,$$

other constraints can be added on the integer vectors $v=(k_1, k_2, \ldots, k_m)$ to define the subset $J_n$. One possible constraint is to consider integer vectors with monotonically decreasing integers: $k_1 \geq k_2 \geq \ldots k_{m-1} \geq k_m$:

$$J_n = \left\{ v = (k_1, k_2, \ldots, k_m): \sum_{i=1}^{m} k_i = n \text{ and } k_1 \geq k_2 \geq \ldots k_{m-1} \geq k_m, \right. \tag{6}$$
$$\left. \text{where } m = 1, 2, \ldots, n \right\}$$

In this case, Equation (2) can be modified by simply replacing $I_n$ by its sub-set $J_n$:

$$S_n = \{(s_1, s_2, \ldots, s_m): \text{ such that } (k_1, k_2, \ldots, k_m) \in J_n\} \tag{7}$$

As previously described, it is preferable that the bit plane partitioning 2 will be performed according to the partition information P that indicates the "best choice" partition in order to maximize the coding efficiency for the signal S. After partitioning the bit-planes into the sub-signals $s_j$, each of these sub-signals are then coded. As can be seen from FIG. 3, it is preferable that each of the sub-signals may be coded starting with sub-signal $s_1$ and ending with sub-signal $s_m$ by using corresponding separate encoders 6.

Employing separate encoders 6 is desirable since it enables the use of different scanning and entropy-coding techniques for each sub-signal. In other words, a different encoding strategy can be used for each of the sub-signals shown in FIG. 3. In this case, each encoding strategy can be designed and optimized for the particular sub-signal resulting from the original data partitioning.

Examples of the encoders 6 that can be employed for the coding of the sub-signals are DCT-based run-length encoders, such as the ones employed by the MPEG-1, MPEG-2, MPEG-4, H.261, and H.263 video standards. In particular, for a sub-signal which consists of a single bit-plane, the MPEG-4 bit-plane Fine-Granular-Scalability (FGS) encoder can be used. A generalization of FGS for coding sub-signals consisting of multiple bit-planes can also be used. Moreover, the family of Embedded Zero-tree Wavelets (EZW) encoding methods can also be used to encode any sub-signal of S. This include the popular SPIHT encoding method, the EZW-based texture coding method adopted by MPEG-4. Approaches that have been proposed to and/or adopted by the JPEG 2000 standard are also good candidates. Another class of entropy encoders that can be used here is the class of Matching Pursuit encoders.

Independent of the type of encoding strategy used, it is preferred that the output compressed-signal includes the different coded sub-signals $\sigma_1, \sigma_2 \ldots \sigma_m$ in an embedded manner. This enables the scalable feature of bit-plane dependent coding. The scalable feature of an embedded signal is useful when the signal is transmitted to the decoder in real-time, or if the signal is stored for later transmission over a variable bandwidth channel. Therefore, if $s_m$ includes the most-significant bit-plane of the source signal S, then the corresponding coded sub-signal $\sigma_m$ is transmitted first. In this case, $s_1$ contains the least-significant bit-plane, and $\sigma_1$ is transmitted last.

Further, according to the present invention, a single encoder system alternatively can be used to code each of the sub-signals in place of the separate encoders 6 shown in FIG. 3. The use of single encoder system would be desirable in this case the same overall encoding strategy (e.g., the order of scanning and the type of entropy coding) can be applied to all sub-signals. The advantage of the latter approach is the simplicity of the corresponding system. A third option exists where some of the sub-signals may share the same encoding strategy and other sub-signals may have their own dedicated encoders. Moreover, the design of the entropy encoder system and/or its parameters could also be influenced by the pre-process used for selecting the best choice $s_o$ described above (see FIG. 3).

Figure 4:
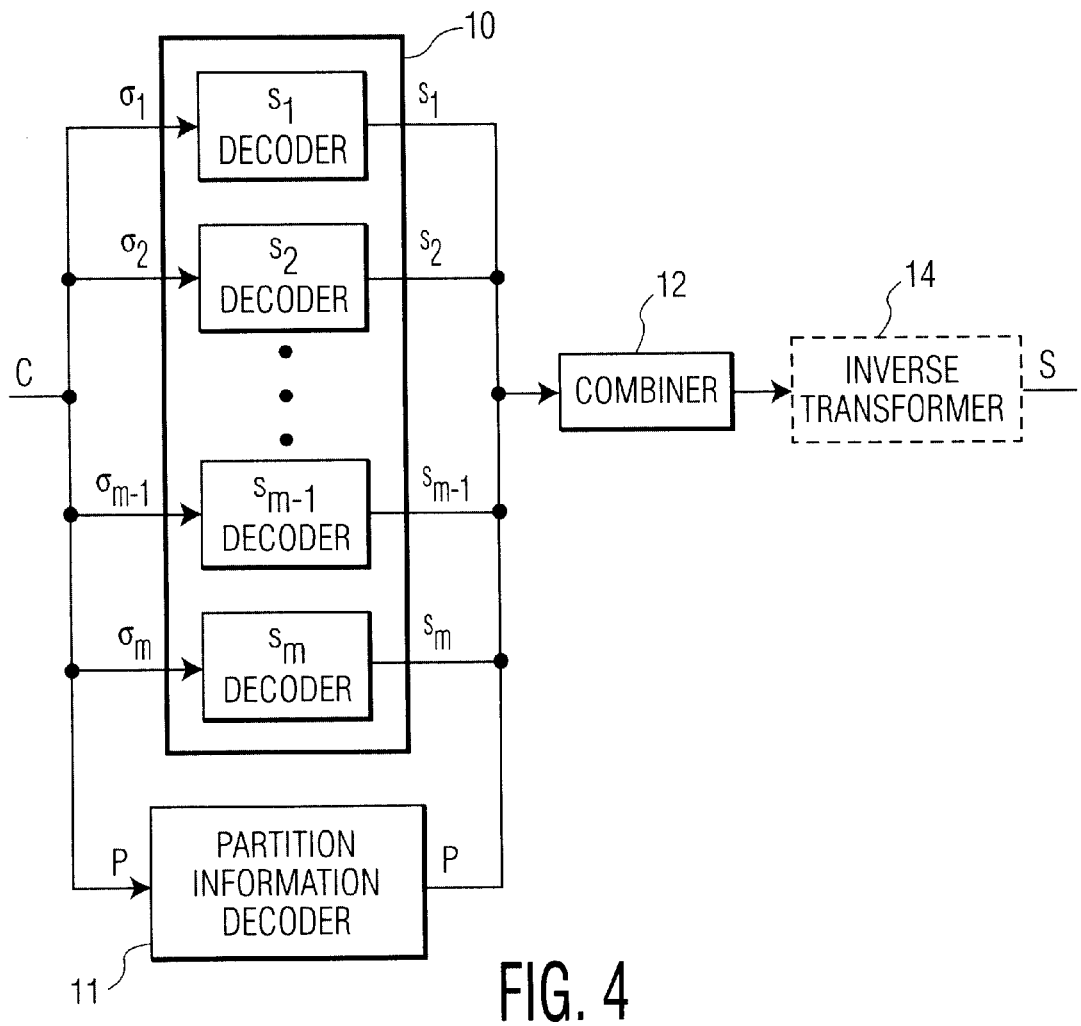
FIG. 4 is a block diagram illustrating one example of the bit-plane de-compression according to the present invention.

One example of bit-plane de-compression according to the present invention is shown in FIG. 4. As previously described, the compressed signal C according to the present invention includes the coded sub-signals $\sigma_1 \ldots \sigma_{m-1}, \sigma_m$ and the partition information P. As previously described, it is preferred that the partition information P indicate the "best choice" partition. However, according to the present invention, the partition information P also can indicate just a predetermined partitioning such as shown in FIGS. 1 or 2.

As can be seen from FIG. 4, separate decoders 10 are also used to decode the coded sub-signals $\sigma_1 \ldots \sigma_{m-1}, \sigma_m$. Each of the decoders 10 is configured to decode one of the coded sub-signals $\sigma_1 \ldots \sigma_{m-1}, \sigma_m$ according to the coding technique performed on the encoder side. A partition information decoder 11 is also included for decoding the partition information P.

Since the coded sub-signals $\sigma_1 \ldots \sigma_{m-1}, \sigma_m$ were either preferably stored or transmitted in an embedded fashion, a single decoder can alternatively be used instead of the separate decoders 10 shown in FIG. 4. The single decoder would first decode the partition information P transmitted by the encoder. The single decoder then would decode the coded sub-signals $\sigma_1 \ldots \sigma_m, \sigma_{m-1}$ preferably in an embedded and progressive fashion starting from the most-significant received sub-signal $\sigma_m$ which is an encoded representation of $s_m$ and ending with the least significant received sub-signal $\sigma_1$ which is an encoded representation of $s_1$.

If on the encoder side, the sub-signals were coded with different encoding techniques the single decoder would have to be capable of changing its coding technique according to the incoming coded sub-signals $\sigma_1 \ldots \sigma_{m-1}, \sigma_m$. This can be accomplished by including additional information in the compressed signal C indicating the coding technique used for each of the sub-signals.

Further, a combiner 12 uses the decoded partition information P to combine the decoded sub-signals into the corresponding bit-planes that were previously partitioned on the encoder side. In performing this operation, the combiner 12 would preferably take into consideration the significance (position) of the bit-planes within the signal. This should result in the original source signal S being present at the output of the combiner 12. However, if a transform was used on the encoder side, only an approximation of the source signal S will result. Therefore, an inverse transformer 14 is required to perform an inverse transform (e.g., Inverse DCT—IDCT—or Inverse DWT—IDWT) on the output of the combiner 12 if such a transform was used on the encoder side.

Figure 5:
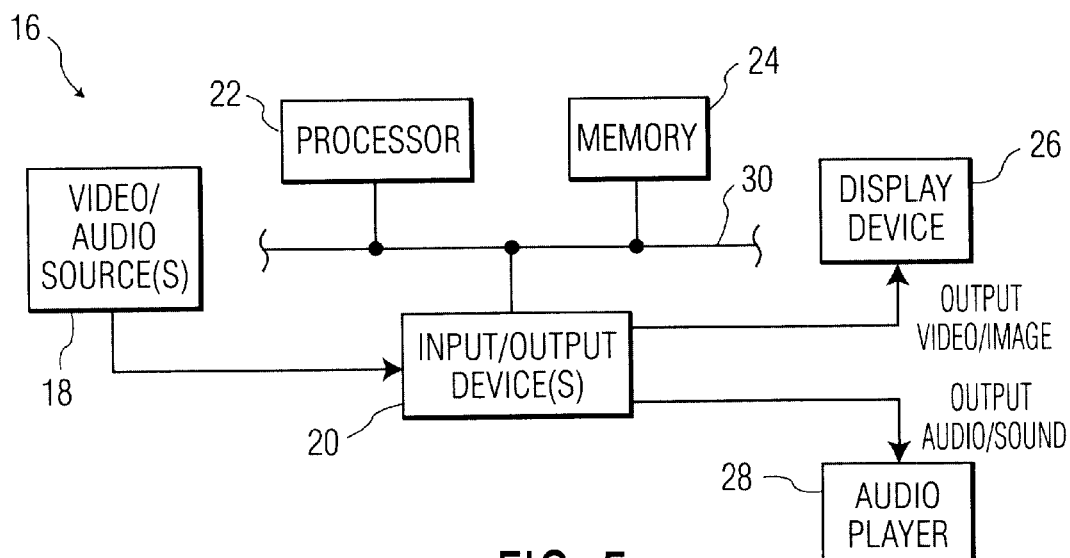
FIG. 5 is a block diagram of one example of a system according to the present invention.

One example of a system in which the present invention may be implemented is shown in FIG. 5. By way of examples, the system 16 may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. The system 16 includes one or more video/audio sources 18, one or more input/output devices 20, a processor 22 and a memory 24. The video/image source(s) 18 may represent, e.g., a television receiver, a VCR or other video/image storage device. The source(s) 18 may alternatively represent one or more network connections for receiving video/audio from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 20, processor 22 and memory 24 communicate over a communication medium 30. The communication medium 30 may represent, e.g., a bus, a communication network, one or more internal connections of a circuit, circuit card or other device, as well as portions and combinations of these and other communication media. Input video/audio data from the source(s) 18 is processed in accordance with one or more software programs stored in memory 24 and executed by processor 22 in order to generate output video/images supplied to a display device 26 and to supply output audio/sound to an audio player 28. The display device 26 and audio player 28 can be separate devices or can be included in a single device such as a television or personal computer.

In a preferred embodiment, the bit-plane compression and de-compression according to the present invention is implemented by computer readable code executed by the system 16. The code may be stored in the memory 24 or read/downloaded from a memory medium such as a CD-ROM or floppy disk. In other embodiments, hardware circuitry may be used in place of, or in combination with, software instructions to implement the invention. For example, the elements shown in FIGS. 3 and 4 can be implemented as discrete hardware elements.

While the present invention has been described above in terms of specific examples, it is to be understood that the invention is not intended to be confined or limited to the examples disclosed herein. For example, the invention is not limited to any specific coding strategy frame type or probability distribution. On the contrary, the present invention is intended to cover various structures and modifications thereof included within the spirit and scope of the appended claims.

What is claimed is:

1. A method for compressing a signal, comprising the steps of:
    partitioning the signal into a plurality of sub-signals; and
    coding each of the sub-signals with a different scanning and entropy coding technique.

2. The method according to claim 1, wherein the sub-signals include different bit-planes of the signal.

3. The method according to claim 1, wherein a number of the sub-signals include different bits from a bit-plane of the signal.

4. The method according to claim 1, wherein the partitioning is performed according to a "best choice" partition.

5. The method of claim 4, wherein the "best choice" partition is determined by:
    defining a number of different partitions for the signal;
    calculating an entropy value for each of the partitions; and
    selecting the partition having a minimum entropy value.

6. The method according to claim 1, which further includes storing or transmitting the sub-signal after coding in an embedded fashion.

7. A method for compressing a signal, comprising the steps of:
    determining a "best choice" partition for the signal;
    partitioning the signal into a plurality of sub-signals according to the "best choice" partition; and
    coding the sub-signals.

8. The method of claim 7, wherein determining the "best choice" partition includes:
    defining a number of different partitions for the signal;
    calculating an entropy value for each of the partitions; and
    selecting the partition having a minimum entropy value.

9. A memory medium including code for compressing a signal, the code comprising:
    a determining code to determine a "best choice" partition for the signal;
    a partitioning code to partition the signal into a plurality of sub-signals according to the "best choice" partition; and
    an encoding code to encode the sub-signals.

10. A method for de-compressing a signal including sub-signals and partition information indicating how the signal was partitioned into sub-signals, the method comprising the steps of:
    decoding each of the sub-signals;
    combining the sub-signals according to the partition information;
    wherein each of the sub-signals was previously coded with a different scanning and entropy coding technique.

11. The method according to claim 10, wherein the partitioning information indicates a "best choice" partition.

12. The method of claim 10, wherein the partition information indicates a number of the sub-signals each include different bits from a particular bit-plane of the signal.

13. A memory medium including code for de-compressing a signal including sub-signals and partition information indicating how the signal was partitioned into sub-signals, the code comprising:
    a decoding code to decode each of the sub-signals; and
    a combining code to combine the sub-signals according to the partition information;
    wherein each of the sub-signals was previously coded with a different scanning and entropy coding technique.

* * * * *